United States Patent [19]
Harris et al.

[11] Patent Number: 5,775,785
[45] Date of Patent: Jul. 7, 1998

[54] ANTI-LOCK BRAKING SYSTEM HAVING PULSED PRESSURE RE-APPLICATION

[75] Inventors: Alan Leslie Harris, Coventry; Mark Ian Phillips, Birmingham, both of England

[73] Assignee: Lucas Industries PLC, Solihull, England

[21] Appl. No.: 537,940

[22] PCT Filed: Jun. 10, 1994

[86] PCT No.: PCT/GB94/01259

§ 371 Date: Nov. 20, 1995

§ 102(e) Date: Nov. 20, 1995

[87] PCT Pub. No.: WO95/26287

PCT Pub. Date: Oct. 5, 1995

[30] Foreign Application Priority Data

Mar. 25, 1994 [WO] WIPO ............. PCT/GB94/00623
Mar. 25, 1994 [WO] WIPO ............. PCT/GB94/00624

[51] Int. Cl.$^6$ ........................................ B60T 8/00
[52] U.S. Cl. ................................. 303/156; 303/174
[58] Field of Search ........................ 303/156, 158, 303/174

[56] References Cited

U.S. PATENT DOCUMENTS

4,585,280  4/1986  Leiber .............................. 303/156
4,900,099  2/1990  Braschel ........................... 303/156
4,921,314  5/1990  Braschel et al. .................. 303/156
5,513,907  5/1996  Kiencke et al. ................... 303/174

Primary Examiner—Matthew C. Graham
Attorney, Agent, or Firm—Oblon, Spivak, McClelland, Maier, & Neustadt, P.C.

[57] ABSTRACT

An anti-skid braking system for wheeled vehicles having fluid actuated brakes associated with the vehicle wheels, has speed sensors associated with the vehicle wheels, a control device responsive to speed signals from the speed sensors to actuate a pressure dump device to periodically release the fluid pressure applied to the brake of any wheel which is determined to be about to lock and to later re-apply the actuating pressure to that brake when the tendency of that wheel to lock has reduced, pulsing of the pressure dump device at intervals during the pressure re-apply phase to cause a repeated interruption to the re-application of pressure to that brake. The pulse timing of the pulsing of the pressure dump device is controlled by the occurrence of wheel angular deceleration being determined to be equal to or in excess of a predetermined threshold value, the magnitude of which is dependent upon events from the previous anti-lock braking cycle.

15 Claims, 11 Drawing Sheets

ANTI-LOCK BRAKING SYSTEM HAVING PULSED PRESSURE RE-APPLICATION

The present invention relates to anti-lock/anti-skid braking systems (ABS) for vehicles.

Anti-skid braking systems for vehicles comprise speed sensors on each of the wheels of the vehicle and a control device responsive to speed signals from the speed sensors to periodically reduce the pressure of actuating fluid to the brake of a wheel which is about to lock in a series of on/off cycles, thereby avoiding or reducing skidding of the wheel.

The control device seeks to combine sensitive control, efficient braking and effective steerability/stability by optimizing the proportion of each cycle in which the wheel is operating close to the tyre's maximum adhesion. As is well known, the magnitude of this braking force, when expressed as a function of the tyre's slip, is characterised by a curve with an asymmetric hump (see curve CB—FIG. 2). The balance of longitudinal and lateral forces which exist at the peak of this curve usually represent an optimum compromise for normal road-going vehicles.

Once the tyre reaches the negatively sloping region of the curve, braking effort begins to diminish—sometimes sharply—and lateral adhesion (curve CS—FIG. 2), which reduces progressively with increasing slip, becomes unable to maintain satisfactory steering or stability. If the wheel strays too far into this region before corrective action is taken, then the control will become coarse, with large angular decelerations and accelerations of the wheel, high slip levels and consequent large-amplitude pressure cycling. To passengers, this will be apparent as a jerky, vibratory sensation.

Efficient braking requires that the wheel should spend as much time as possible at, or very close to, the slip level which corresponds to the peak braking force. This means that the pressure rise rate has to be relatively flat, so that the time taken for the wheel to pass through the region of maximum braking force is prolonged. Control refinement will also benefit through a reduction in "pressure overshoot", i.e. the degree to which the brake pressure exceeds the ideal pressure during the time needed by the system to detect the impending skid and initiate corrective action.

Effective steering/stability is best assured by allowing the wheel to spend part of each cycle in the positively-sloping, i.e. underbraked region, of the curve. This occurs naturally as a consequence of pressure undershoot during the pressure dump phase, but needs to be controlled by providing rapid restoration to the ideal pressure if efficiency is to be maintained.

Thus, there is a need for a rapid pressure reapply rate during a first stage of brake force restoration, but a slower rate thereafter.

It is known to achieve this, in the context of a flow-valve system, by pulsing the pressure dump solenoid at intervals to cause a repeated interruption to the otherwise smooth reapply phase, generating a saw-tooth profile with a flatter overall rise rate. Thus, the emphasis is upon the macro effect of the pulses upon the pressure-rise rate. In the prior art, both the intervals and the timing of the first pulse are predetermined, e.g. by a prescribed relationship with events (e.g. pressure dump and/or reapply duration) from the previous cycle. However, the correlation between these parameters and optimum pulse timing is often non-linear, rendering the predictions reliable only within a narrow range of operating conditions.

In accordance with the present invention, the pulse timing is controlled by the occurrence of wheel angular-deceleration being equal to or in excess of a predetermined threshold value, the magnitude of which is adapted in dependence upon events from the previous cycle.

Thus, the pulse timing is arranged to be dependent upon current data about the ability of the wheel to resist the applied braking force. Each pulse thereby assumes increased importance since only through its action in preventing the wheel from approaching the brink of locking can the wheel's time in the peak adhesion zone be extended.

The main advantage of this principle is that the timing of the pulses is more reliable, with less likelihood that they will be introduced too early, which would waste the flatter section of the pressure rise at a relatively low pressure region. This error could then be compounded by the effects of coping with the normal pressure rise rate when the skid pressure is reached. (The duration of the flatter re-apply rate has to be limited to ensure an adequate reaction to unexpected large-scale improvement in surface adhesion).

In addition, the provision of the invention will allow the ABS to cope more effectively with naturally occurring cycle-to-cycle variations in optimum pressure, such as may be caused by surface inconsistency or changes to wheel loading during manoeuvres.

In some embodiments, the threshold adaption is arranged to be based upon the proximity of the pulses to the immediately following pressure dump. In other embodiments the threshold adaption is arranged to depend upon the level of slip which occurred during the previous cycle. Both of these have been found to provide effective control of pulse timing.

The principle can be applied to systems featuring fixed orifices or a hold solenoid in place of the flow-valve. In the latter case, the deceleration threshold controls the timing and/or duration of the hold solenoid pulses.

Figure 1:
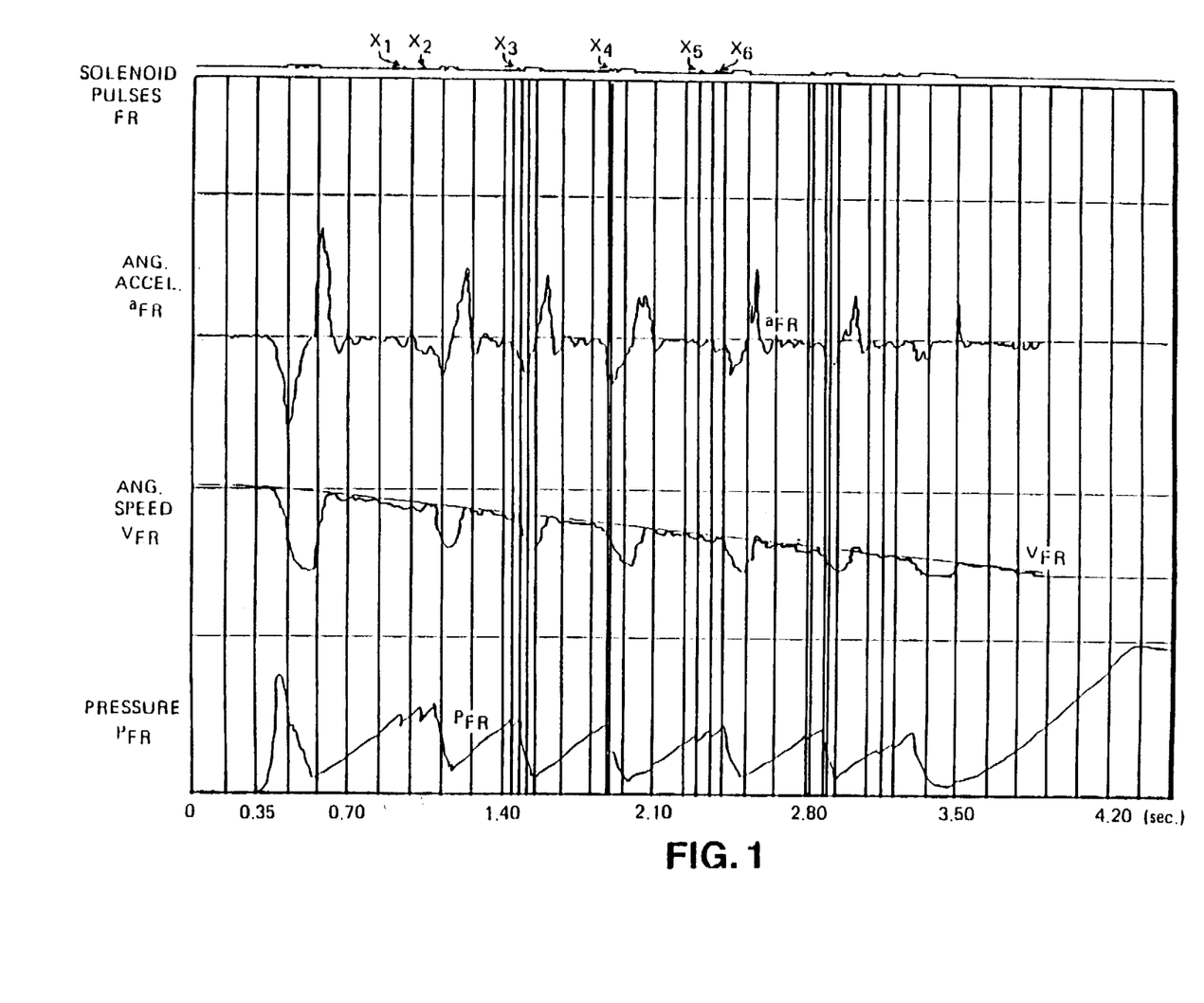
FIG. 1 shows a series of operational curves illustrating one example of a system operating in accordance with the present invention.

The invention is described further hereinafter, by way of example only, with reference to the accompanying drawings, in which:

FIG. 1 shows the brake pressure ($P_{FR}$), rotational speed ($V_{FR}$) (scaled in equivalent linear speed), angular acceleration ($a_{FR}$) scaled in equivalent linear acceleration) and ABS dump solenoid status (FR) of a braked wheel running on snow.

The brakes are applied abruptly at a time of 350 ms along the time scale so that the surface adhesion is overcome almost immediately and the wheel decelerates (−ve acceleration) rapidly, causing ABS intervention. Once the pressure $P_{FR}$ has been relieved, the wheel speed recovers very quickly, with a high acceleration peak, and then resonates briefly due to the compliance of the suspension mountings and of the tyre itself. The resonance causes a deceleration and subsequent acceleration of +/−2 g, after which the activity subsides, with small excursions to +/−0.25 g, but then rises again at 950 ms as the wheel slip begins to increase.

When the deceleration reaches 1.5 g, a fixed pulse $X_1$ (in this case of 7 ms) is arranged to be issued to the solenoid. At this point the pressure is 48 bar, and the pulse causes a fall to 41 bar, which is sufficient to arrest, and even reverse the slip trend, and the deceleration retreats. Eighty-four ms later, however, the pressure has recovered to 53 bar and the deceleration breaches the −1.5 g level again, causing a further 7 ms pulse $X_2$ which serves to reduce the deceleration and maintain the gradual rate of slip increase. Thereafter no further pulses are allowed so that matters are allowed to take their natural course when the deceleration increases once more, and a normal, i.e. closed-loop-controlled dump follows when the slip level begins to increase sharply with the pressure at 56 bar.

Figure 2:
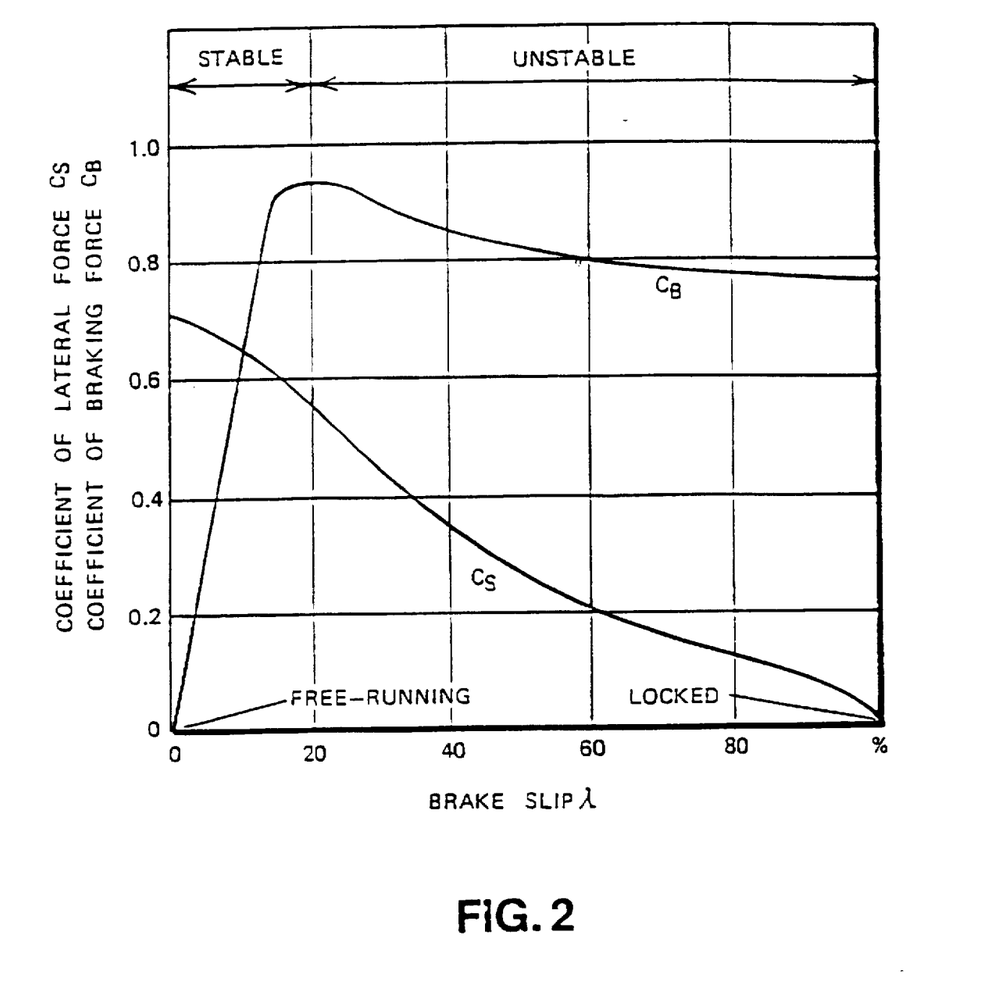
FIG. 2 shows how the coefficients of lateral force (CS) and braking force (CB) vary with brake slip in a typical example.

The fixed 7 ms pulses $X_1$ and $X_2$ have served to prolong the time which the wheel is able to spend in the optimum slip range. In this case the slip between the first pulse and the closed-loop dump has ranged from 18% to 25%, i.e. on the positive flank of the mu slip curve peak (FIG. 2—CB).

As a byproduct of the pulse timing, the overall pressure rise rate has been flattened from the first pulse $X_1$ onwards.

When the system utilises the first alternative mentioned hereinbefore, wherein the threshold adaption is based upon the proxlimity of the pulses to the immediately following pressure dump, then from the point where the normal dump signal is initiated, the proximity of the pulses X to the dump is evaluated, and a decision is made whether to adapt the (−1.5 g) threshold to a higher or lower level. In the case illustrated in FIG. 1 the timing was judged to be satisfactory, and the threshold remains unaltered. In the following cycle, however, after pulse $X_3$ at 1.5 g the wheel skids after a further 50 ms at a lower pressure of 44 bar, due possibly to a change in adhesion or wheel loading. The interval between $X_3$ and the following dump is much shorter than that of the preceding cycle but the system in accordance with the invention managed pulse $X_3$ which was able to effect a small delay to the progress of the wheel over the peak of the μ-slip curve.

This time the pulse proximity was adjudged too close, and so the threshold is incremented to −1.25 g, but the skid pressure has reduced further (41 bar) in next cycle so that once again only a single pulse ($X_4$) has been possible, and the proximity is worse in the preceding cycle.

A further increment of the threshold is made and, with no further fall in skid pressure, the pulse position at the next cycle is once again adjudged to be correct with pulses $X_5$ and $X_6$ now being initiated at the −1.0 g threshold.

Figure 3:
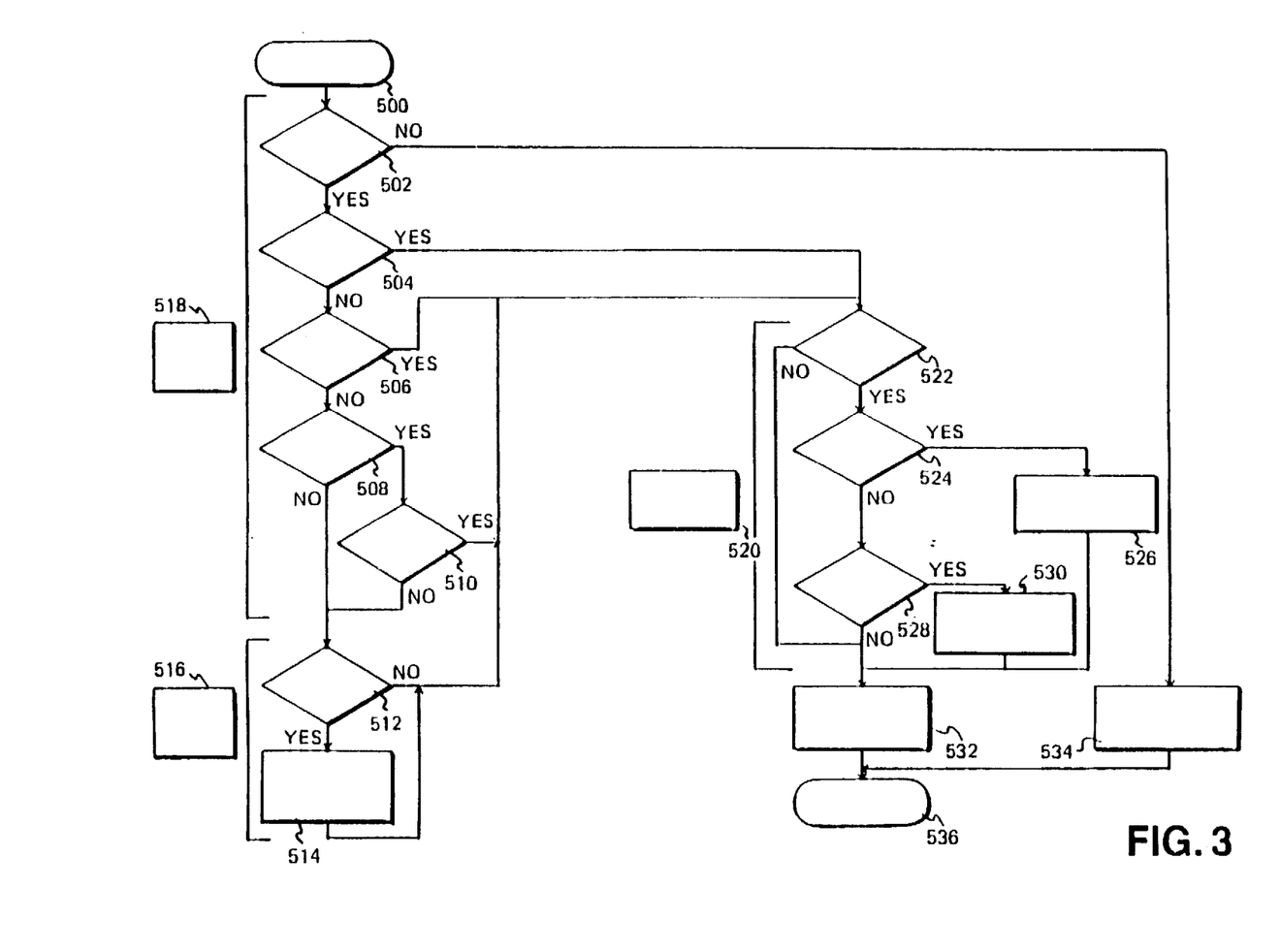
FIG. 3 is a flow diagram illustrating the operation of a system embodying the present invention.

FIG. 3 illustrates by way of a flow diagram the operation of one embodiment in accordance with this invention. The various boxes in FIG. 3 are identified as follows:

500—Deceleration Dependent Adaption (DDA) pulse
502—Is ABS Active on this wheel?
504—Is time since last real dump<DDA INHIBIT TIME?
506—Is time since last real dump>DDA DISABLE TIME?
508—Have any DDA pulses been issued during the current ABS cycle?
510—Has the maximum number of DDA pulses been issued in this ABS cycle?
512—Is current wheel acceleration more negative than the current DDA threshold?
514—Issue a DDA pulse to this wheel's solenoid
518—Check for DDA inhibit conditions
516—Check for DDA requirement
520—Adapt the DDA threshold
522—Has a new REAL dump just been demanded
524—Was first DDA pulse in the last ABS cycle too early?
526—Make the DDA threshold more negative
528—Was first DDA pulse in the last ABS cycle too late?
530—Make the DDA threshold more positive
532—Reset DDA timers and counters for this wheel
534—Initialise DDA system for this wheel
536—Repeat for each wheel.

There now follows an explanation of a system which utilises the second alternative mentioned hereinbefore, wherein the threshold adaption is arranged to depend upon the level of slip which occurred during the previous cycle, the latter evaluation being used to increment either the actual pressure dump threshold or an associated pulse threshold so as to maintain the peak slip at an optimum level.

Figure 4:
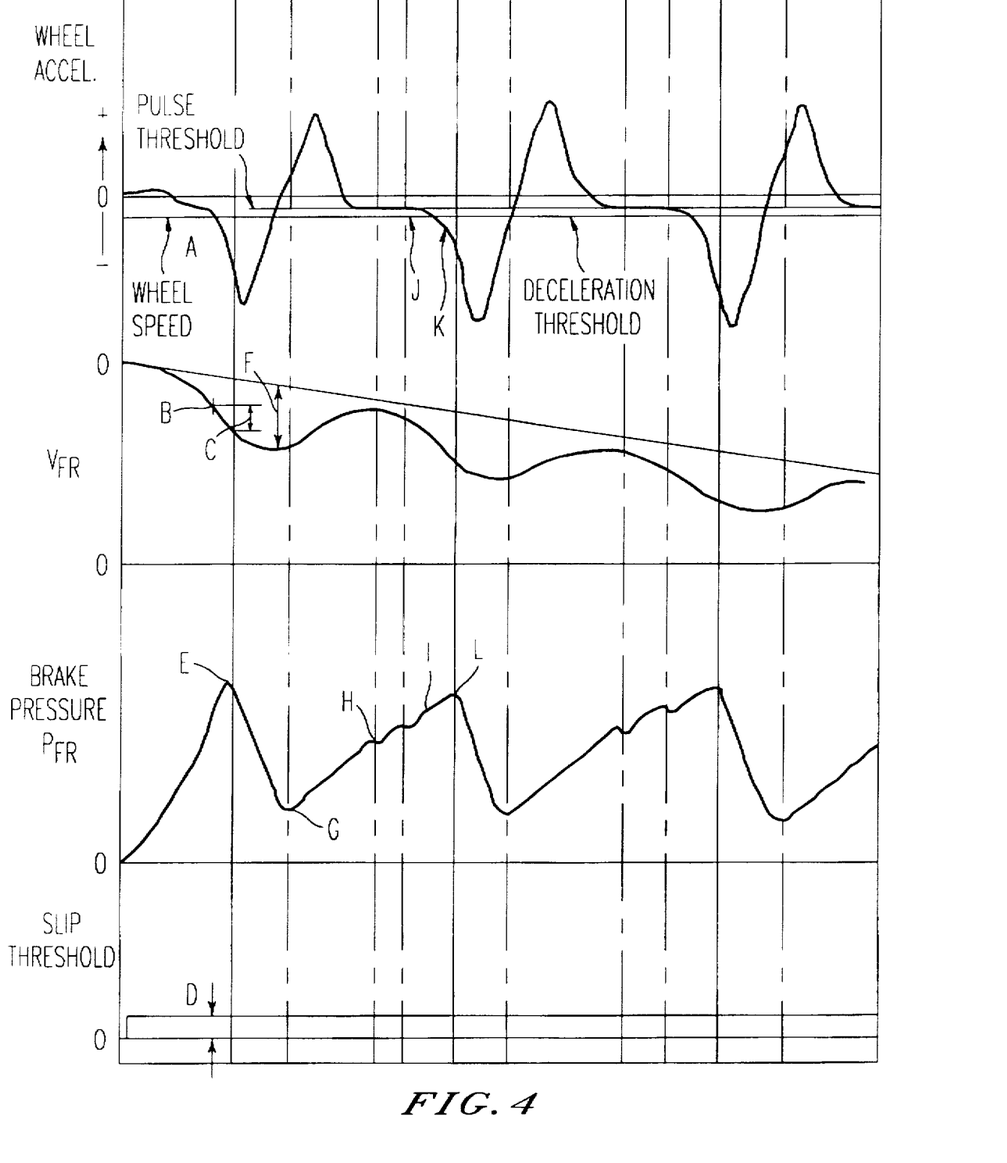
FIGS. 4, 5 and 6 show operational curves used in illustrating the operation of an alternative system in accordance with the invention.

With reference first to FIG. 4, there is illustrated a typical set of operational curves for an ABS system from which the pressure dump point is established, in accordance with well-known practice, as follows.

FIG. 4 shows four traces which are, from top to bottom, wheel acceleration/deceleration $a_{FR}$ (with deceleration threshold value (−b) superimposed upon it), wheel speed $V_{FR}$ (with the vehicle reference speed), wheel brake pressure $P_{FR}$, and slip threshold ST in terms of wheel velocity (i.e. kph). On the application of the brake, pressure $P_{FR}$ rises within the brake from (0) to point (E). This causes the braked wheel to slow down with respect to the vehicle speed over ground from (0) towards point (B). The change in velocity of the braked wheel is reflected as a deceleration from (0) towards (A). When this deceleration value reaches the deceleration threshold at (A), usually set at 1.5 g, the braked wheel velocity (B) is stored. The braked wheel continues to slow down and the ABS system dumps the brake pressure when the additional speed drop (C) is equal to the slip threshold (D). The brake pressure is relieved and the braked wheel speed begins to recover after reaching a minimum velocity which, when compared to the vehicle velocity, provides a peak slip value (F).

The latter combination of deceleration threshold and slip threshold for determining the pressure dump (release) point is a standard technique and is well known in the field of ABS systems.

In accordance with the second alternative of the present invention, use is made of the peak value (F) of the slip from the previous cycle to alter the position of point (A) (i.e. the deceleration threshold), and therefore the position of an associated pulse threshold which may be displaced from the deceleration threshold by a small increment, for the next cycle so that when that pulse threshold is met in the following pressure application the system applies a pulse of short duration in an attempt to arrest the rapid deceleration of the braked wheel associated with the loss of adhesion as the wheel passes over the peak of the μ slip curve $C_B$ of FIG. 2. The 'small' increment is preferably positive with respect to the deceleration threshold but it may also be slightly negative with respect to said threshold as long as the pulse threshold level is calculated so that pulse firings are triggered prior to any 13 real dump firings.

By way of example, FIG. 4 illustrates one aspect of the present invention wherein an associated pulse threshold is used in conjunction with the deceleration threshold to determine the point at which the adapted pulse signals are applied. The pulse threshold as indicated is for this example 0.25 g more positive than the deceleration threshold.

Referring now back to FIG. 4, after the cessation of the first wheel skid cycle, the peak slip value (F) is compared against an upper and lower limit of slip to ascertain whether or not the ABS system managed to constrain the braked wheel within or around the optimum peak on the µ slip curve of FIG. 2 curve $C_B$.

If the peak slip value were to be within the prescribed range of perhaps 10% to 20% slip, where slip is defined as the ratio of depression in wheel speed to vehicle speed, then a reasonable level of wheel control would be adjudged to have been achieved.

If the peak slip value achieved were less than 10% then this would indicate that the skid correction happened too early and optimum utilisation of the available tyre to road adhesion was not obtained. The system would compensate for this by increasing the deceleration threshold by a small increment of usually 0.25 g, making the deceleration threshold less sensitive. A similar increment would also be applied to the pulse threshold which would maintain the 0.25 g differential between itself and the deceleration threshold. If the peak slip value were in excess of the upper limit of 20% then this would indicate that the skid correction happened too late. The deceleration threshold would then be lowered by a small increment of 0.25 g in a direction to make it more sensitive. An equivalent increment would also be applied to the pulse threshold.

In this particular example it is assumed that the peak slip values are maintained within the prescribed 'window' of upper and lower limits. Upon recovery of the wheel speed, the system reapplies pressure to the brake on the controlled wheel from point (G) towards point (H). This is accompanied by a deceleration in the braked wheel which, as the pressure approaches point (H), brings the deceleration level up to that of the pulse threshold. At this point, a short 7 ms pulse is applied to the dump solenoid of the flow valve modulator. This has the effect of holding back the progressive increase in deceleration of the wheel. After the short pulse, the pressure resumes its increase towards point (I) which generates another additional deceleration demand causing the wheel deceleration to once more reach the pulse threshold. Another 7 ms pulse is applied which again holds off the rapidly increasing progression of the deceleration of the wheel until finally the wheel, with increasingly applied brake pressure, passes the pulse threshold and reaches the deceleration threshold at (K). After a further increase in slip, equal to the slip threshold, the ABS system applies a 'real' dump of the wheel brake pressure at point (L). The system continues to operate from cycle to cycle, issuing pulses whenever the pulse threshold is achieved up to a pre-set maximum number of pulses which, in this case, is 2 pulses. Additional pulses could be allowed if so desired.

The present embodiment where a fixed offset from the deceleration threshold is used for the pulse threshold provides a saving on memory (RAM) in the process controller when compared to a system where the pulse threshold has to be calculated.

Figure 5:
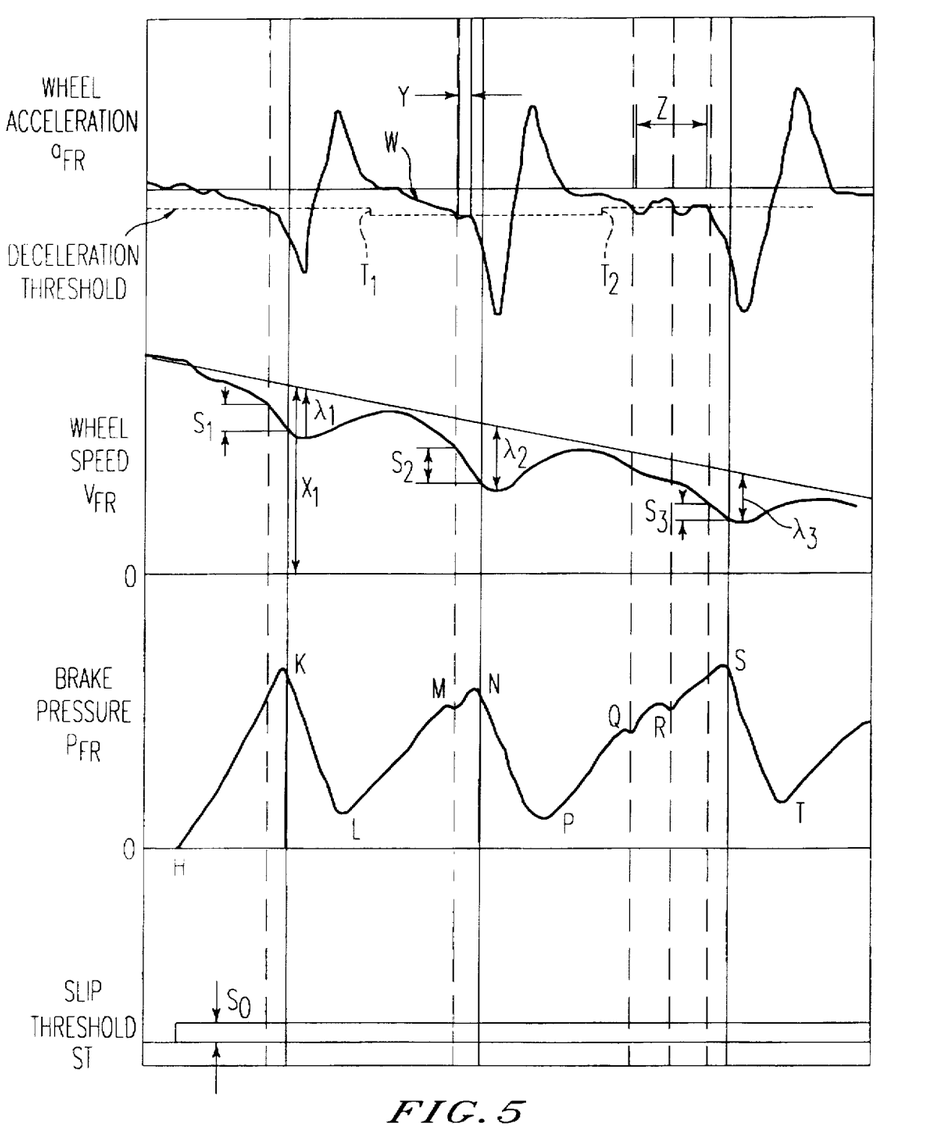

With reference to FIG. 5, the pulse threshold and the deceleration threshold are treated as a common threshold which is incremented in accordance with the invention. The description of FIG. 5 also details the 'adaptive' effect of the invention where both positive and negative increments are applied to the pulse/deceleration threshold in dependence upon the peak value of slip achieved in the previous skid cycle. It must be understood that the adaptation as described in the following description could equally be applied to the base system as illustrated in FIG. 4 and hereinbefore discussed.

Referring now to the traces of FIG. 5, the wheel brake pressure is applied from point E towards point K. This causes the wheel to slow down with respect to the vehicle, which again is interpreted as a wheel deceleration. When this deceleration reaches the 1.5 g threshold, the wheel speed is stored and monitored. When the wheel speed decreases further by an amount equal to the slip threshold, then the ABS system dumps the brake pressure which in turn allows the braked wheel to speed up. The point at which the vehicle's wheel is slowest with respect to the vehicle itself is, of course, the peak slip value ($80_1$) for that particular ABS cycle. In accordance with the present system, this slip value is arranged to be compared with an upper and lower limit of, for example, 20% maximum and 10% minimum. If the measured slip value is within this range of slip, i.e. 10% $<\lambda_1/X_1, >20\%$, then no adjustment is made to the deceleration threshold. However, if $\lambda_1$ is less than 10% then the deceleration threshold is made less sensitive, i.e. more negative, by an increment of, for example, 0.25 g, so that the new deceleration threshold would become 1.75 g. On the other hand, if $\lambda_1$ is greater than 20% then the skid cycle was obviously too deep and the dump point needs to occur sooner on the next cycle, i.e. the deceleration threshold is made more sensitive, i.e. more positive, by an increment of, for example, 0.25 g to 1.25 g from 1.5 g.

In the illustrated example, it has been assumed that, $\lambda_1<10\%$ so that the deceleration threshold is incremented by −0.25 g at point $T_1$ sometime immediately following the end of the preceding skid cycle. The wheel speed recovers as the pressure is dumped from point K to L and the ABS system recovers control by reapplying the brake from point L towards point M. As the pressure increases towards the previous skid pressure the wheel again begins to slow down with respect to the vehicle, which is shown as a deceleration at W. When the deceleration level reaches the new, less sensitive, threshold at −1.75 g, a short (e.g. 7 ms) pulse is applied to the dump solenoid of the ABS modulator (this could also be a 7 ms hold on the inlet solenoid of a 2 solenoid per channel modulator where pulsing of the inlet solenoid controls the rate at which the brake is reapplied). This pulse causes a short fall or hold in the brake pressure rise rate which is reflected as a short halting of the increase in deceleration Y. This short holding back of the skid progression actually produces a much improved adhesion utilisation as the tyre to road slip value is held at a point that is very close to the peak on the µ slip curve CB of FIG. 2 for an extended period.

If it is now assumed that $\lambda_2$ was actually in excess of 20% on this second cycle, then an associated incremental step of 0.25 g would be applied at $T_2$ to the present −1.75 g threshold. This would have indicated that the second skid cycle was too deep and the next cycle needs to be initiated at a slightly earlier point. The brake pressure is now reapplied from point P towards point S. At point Q the wheel deceleration has reached the new deceleration threshold of 1.5 g and a short 7 ms pulse is applied to relieve and recover the increasing deceleration. At point R the wheel deceleration again reaches the 1.5 g deceleration threshold and another, second, 7 ms pulse is applied which has a similar effect of recovering, for a short period, the onset of slip. Thereafter, in this particular instance, no further pulses are allowed and the wheel deceleration is allowed to increase normally to a point where the ABS system intervenes to dump the brake pressure at S. Depending upon the system, additional pulses may be allowed, but for this example two pulses were enough to extend the period in which the wheel remained in the peak slip area on the µ slip curve of FIG. 2.

This period is indicated at Z. The system continues in adjusting the deceleration threshold in accordance with the peak slip values from the previous cycle, i.e. $\lambda_3$ etc.

A situation could occur in practice where the effective slowing down in pressure rise rate is not preferred. In particular, this could happen when the vehicle passes from a low mu surface to a high mu surface. On the low mu surface, a relatively low pressure is applied to produce a skid cycle whereas on a high mu surface a relatively high pressure is required. At the transition from low to high, the build-up in a pressure needs to happen as quickly as possible in order to utilise the adhesion on the improved surface.

Figure 6:
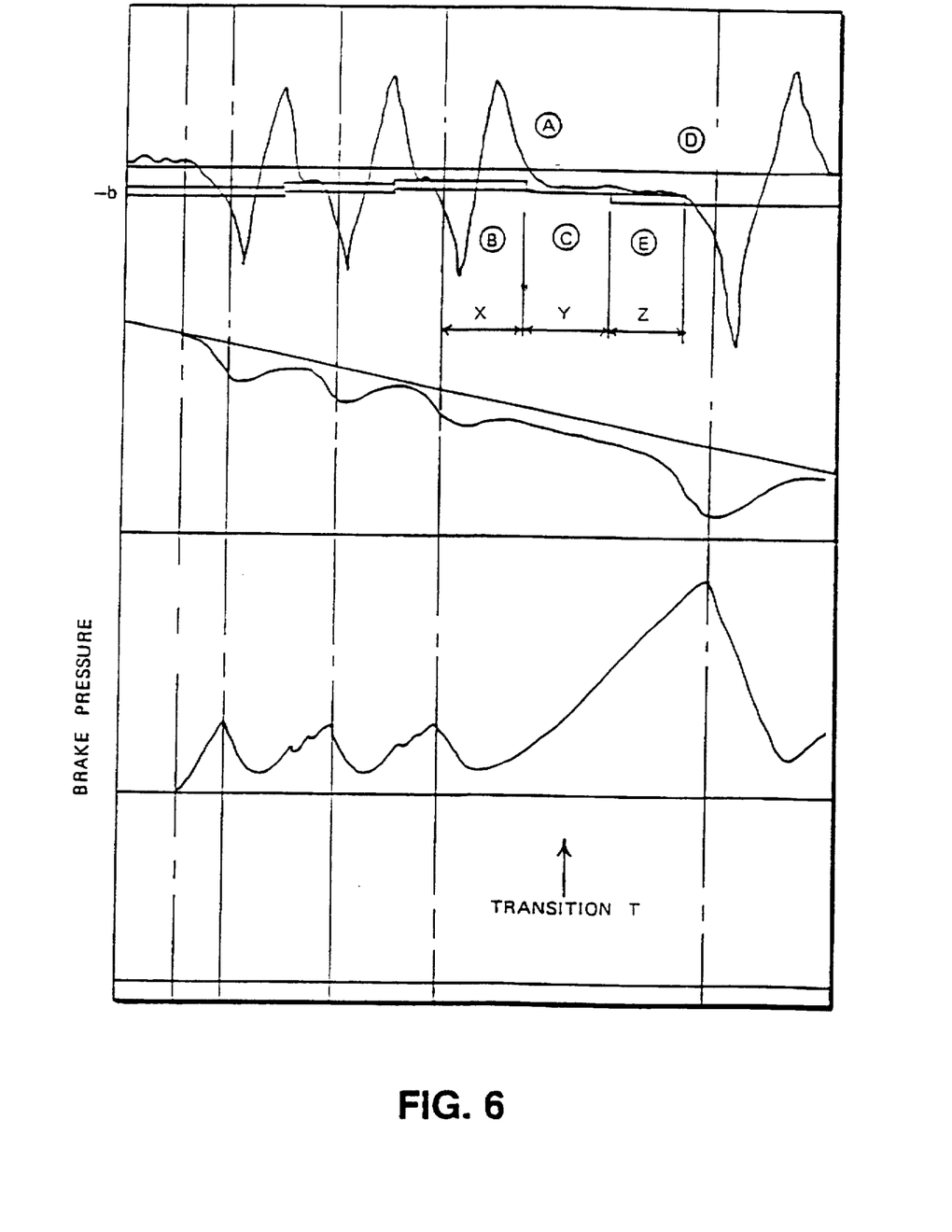

Referring now to FIG. 6, a system, as described substantially as hereinbefore where both pulse and deceleration thresholds are used with the pulse threshold being displaced from the deceleration threshold by a small positive increment of 0.25 g, is shown working initially on a low mu surface with relatively low skid pressures passes at some intermediate transition point as illustrated at (T), from the low mu surface onto a surface of a higher friction co-efficient. At this point it is assumed that the previous skid cycles had caused the pulse and deceleration thresholds to adapt towards the more sensitive region so that at the transition point (T) the deceleration threshold is set to 1.0 g as shown at (B) and the pulse threshold is offset a further 0.25 g in the positive direction at −0.75 g as shown at (A). At this point the applied braking pressure is too small to generate a wheel deceleration which would cause a 'real' skid, but as the pressure increases there is a tendency for the pressure to generate a sufficiently large deceleration to cause a pulse firing should the pulse threshold remain at the −0.75 g level. A pulse firing at this stage would, of course, delay the required rapid increase in pressure to suit the improved road conditions. This can be prevented by incrementing the pulse threshold (with respect to the deceleration threshold) at suitable time intervals, e.g. 150 ms. After each 150 ms period as shown at X, Y and Z, the pulse threshold is incremented a further −0.25 g thus making the system less sensitive to pulse demands. Therefore at point (C) the pulse threshold is −1.0 g, now equal to the deceleration threshold, then after a further 150 ms an additional increment is added so that at (E) the pulse threshold is −1.25 g. A further increment of −0.25 g is applied at the end of the next 150 ms period and from this point onwards the pulse threshold could either be maintained at the adjusted level or optionally the 150 ms increment could continue until the following real dump firing.

In addition to the 150 ms increments to the pulse threshold a resetting of the deceleration threshold, as illustrated, could take place at the 450 ms point. The choice of 450 ms is based on an assumption of when, after a real brake dump it would be safe to assume that, in the absence of any further real dump firings, that the tyre to road friction co-efficient had improved. Therefore it must be understood that whilst this specific time period is applied to this example, the actual time period may vary in dependence upon the specific installation. Upon expiry of the reset period the deceleration threshold is reset to its base level of 1.5 g. This then ensures that the next skid cycle, now adjudged to be on a much improved surface, utilises the available adhesion. Had the deceleration threshold not been reset, then the next real dump would have fired prematurely, with a shallow skid cycle, having dumped too early from a lower deceleration level.

Figure 7:
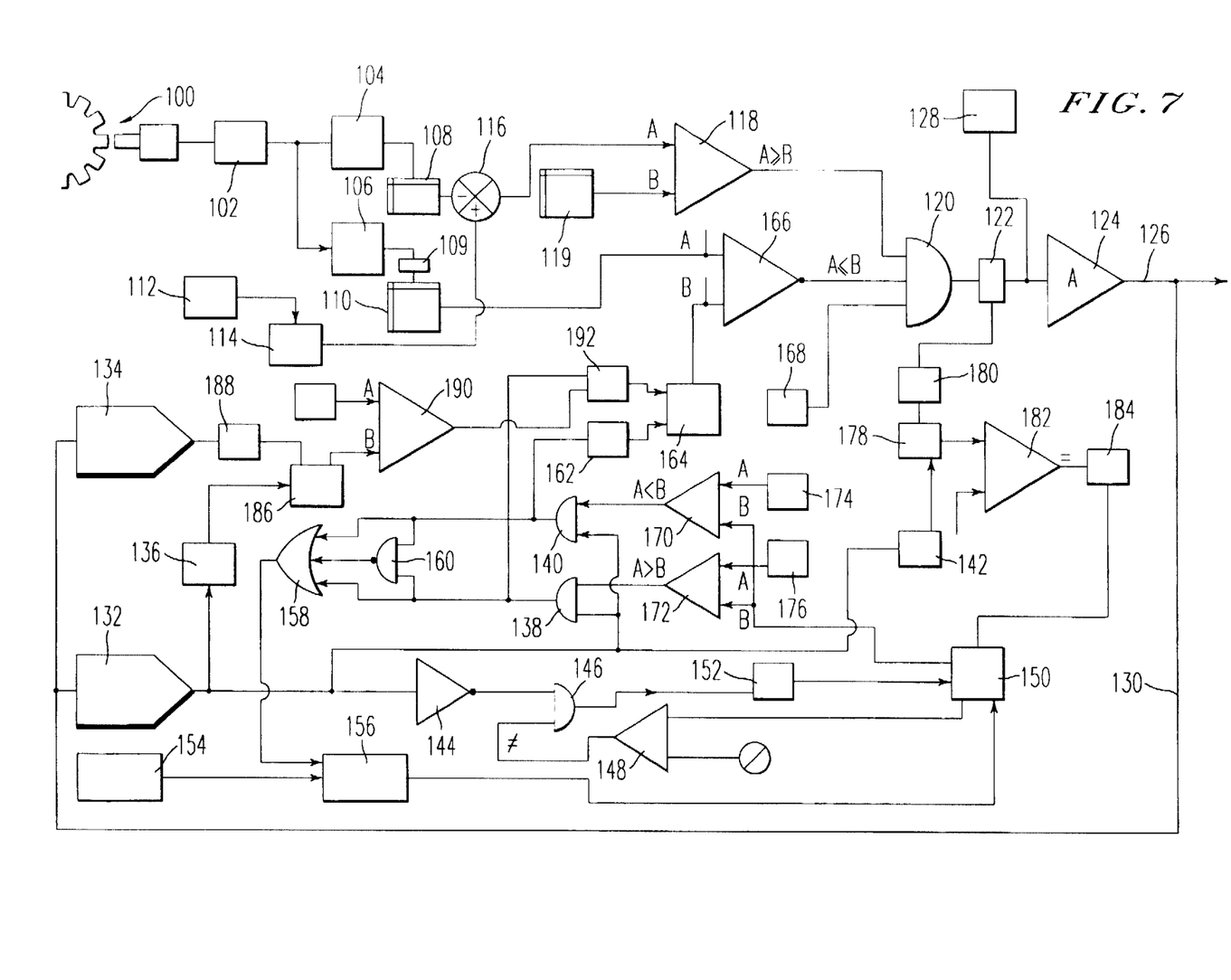
FIG. 7 illustrates one embodiment in accordance with the present invention.

FIG. 7 shows one possible embodiment of an embodiment of the first type described hereinbefore wherein the threshold adaption is arranged to be based upon the proximity of the pulses to the immediately following pressure dump.

Reference number 100 identifies a conventional wheel speed sensor associated with one of the vehicle wheels (not shown). The output signal from the sensor 100 is conditioned at 102 and passed both to a wheel speed calculating unit 104 and a wheel deceleration calculating unit 106. The resulting calculated wheel speed and wheel deceleration signals are stored in speed and deceleration stores 108, 110. The vehicle speed is calculated in a speed calculation unit 112 and stored in a vehicle speed store 114. The wheel speed signal from store 108 is subtracted in an arithmetic unit 116 from the vehicle speed held in the store 114 to provide a signal (SLIP) representative of the slip of that wheel relative to the road surface. The SLIP signal is applied to one input (A) of a comparator 118 where it is compared with a reference signal (B) corresponding to a predetermined slip level, in this example of 1 kph, provided by a store 119. If the result of the comparison shows that A≧B then a signal is applied to one input of an AND gate 120.

Between the units 106 and 110 there can optionally be located a deceleration filter 109 as described further hereinafter in connection FIGS. 9 and 10.

The output of the AND gate 120 is coupled via an element 122 to the input of a solenoid driver 124 which provides a signal on a line 126 leading to a solenoid (not shown) whose actuation results in the fluid pressure to the relevant brake actuator being released (dumped). The element 122 is arranged to emit a short duration pulse to the solenoid driver 124 when it receives the output signal of the AND gate 120.

Also connected to the input of the solenoid driver 124 is the output of a standard ABS detection system shown collectively by the box 128. This system 128 actuates the solenoid driver 124 to cause closed loop controlled dumping of the actuating pressure in accordance with conventional ABS practice and is not illustrated in detail.

The dump signal on the line 126 provided by the solenoid driver 124 is also fed by a line 130 to the inputs of a "start of closed loop controlled dump" unit 132 and an "end of closed loop controlled dump" unit 134. The output of the unit 132 is connected firstly to a "clear timer since end of last closed loop controlled dump" unit 136, secondly to first inputs of two AND gates 138,140, thirdly to the input of a "clear pulse count" unit 142 and fourthly to the input of an inverter 144. The output of the inverter 144 is applied to one input of an AND gate 146 whose other input is connected to the output of a comparator 148, having one input connected to a zero reference voltage and a second input connected to an output of a "first APT (adaptive pulse threshold) pulse timer store" 150. The output of the AND gate is connected to the first APT store 150 via a unit 152 which is adapted to increment the first APT once per second. An element marked 154 provides a signal when the main ABS is "not active" and passes this signal to one input of a unit 156 which acts to clear the first APT store 150 when activated. The unit 156 also receives the output of a NAND gate 158 whose three inputs are connected respectively to the output of an OR gate 160 and the outputs of the AND gates 138 and 140. The outputs of the AND gate 140 is also connected to the input of an "increment" unit 162 coupled to one input of an "APT threshold store"0 164 connected to one input of a comparator 166. The other input of the comparator 166 is connected to the wheel deceleration store 110 and its output is connected to another input of the AND gate 120. A still further input of the AND gate 120 is connected to a unit 168 which produces an output whenever the main ABS (128) is active. The first APT pulse timer store 150 also provides signals to the B inputs or two further comparators 170,172. The A input of comparator 170 is connected to a "lower limit"

reference 174 and the A input of the comparator 172 is connected to an "upper limit" reference 176. Comparators 170 and 172 provide outputs when A<B and A>B at their respective inputs.

The "clear pulse count" unit 142 is connected to a pulse count store 178 which receives pulse count signals from the output of the AND gate 120 via an "increment pulse count" unit 180. The output of the store 178 is connected to one input of a comparator 182 where it is compared to a reference level of "1". If the output of comparator shows that the count is one, then a signal is provided to a "start first APT pulse timer" element 184, coupled to the first APT pulse timer store 150.

The output of the "clear timer" unit 136 is connected to a timer (Pa Brake) 186 which also receives an input from the "end of closed loop controlled dump" unit 134, via a "start timer since end of last closed loop dump" element 188. The output of the timer 186 is connected to one input (B) of a comparator 190 whose other input (A) receives a reference value, eg. 150 ms. The output (X) of the comparator 190 is fed to one input of a "decrement unit" 192, having a second input connected to the output of the AND gate 138. The output of the "decrement" unit 192 leads to a second input of the APT threshold store 164.

Figure 10:
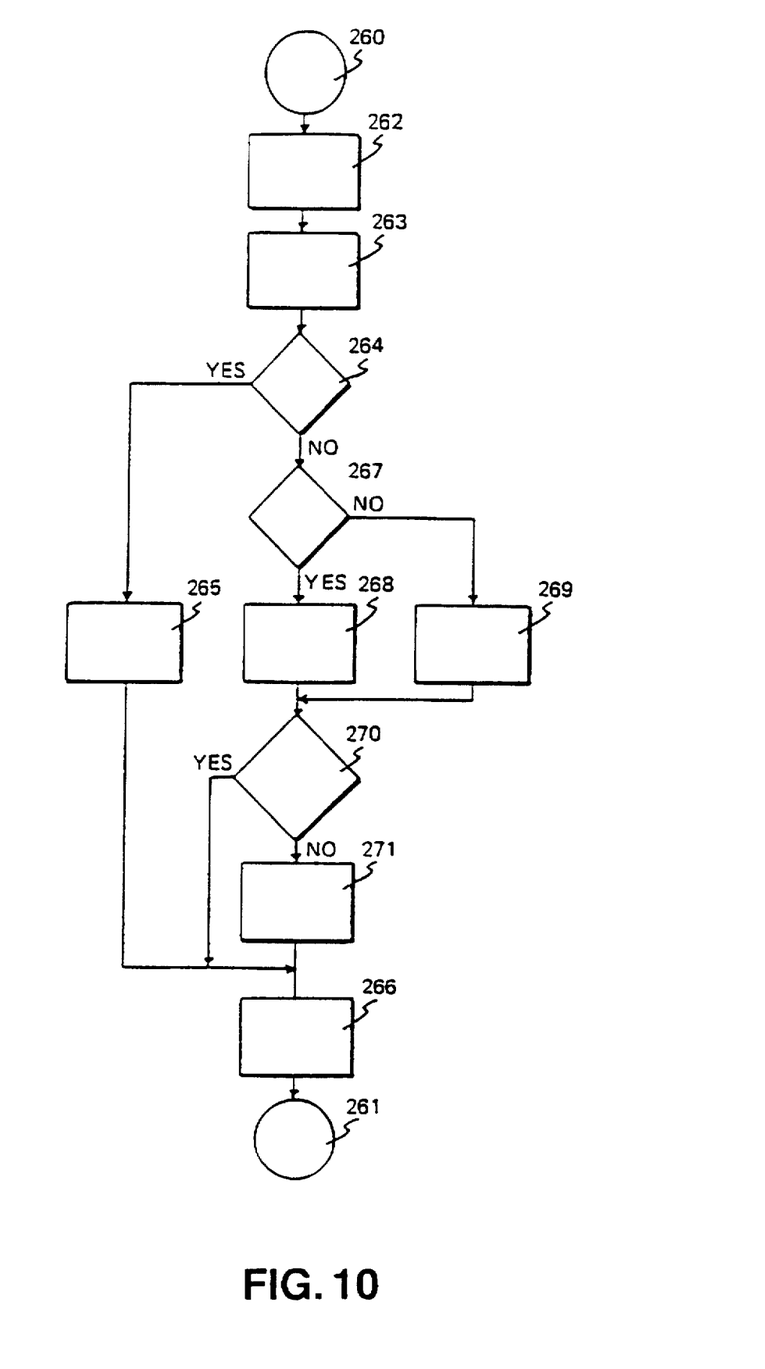
FIG. 10 is a flow diagram illustrating the operation of the deceleration filter arrangement.

In the event that the deceleration filter 109 of FIG. 7 is used, the routine of FIG. 10 can be applied.

The various boxes in FIG. 10 are identified as follows:
260—Deceleration filter
262—Calculate new deceleration
263—Calculate DIFFERENCE, ie new deceleration minus old deceleration
264—Is magnitude of DIFFERENCE ≦6?
267—Is direction of change up?
265—Mark direction of change NONE for next time
269—Mark direction of change UP for next time
269—Mark direction of change DOWN for next time
270—Is direction of change same as last time?
271—Limit new deceleration to "old deceleration" or to + or −6
266— Save new deceleration
261— Done FIG. 10 shows a deceleration filter routine also performed by an electronic control unit, which recycles between the entry 260 and exit 261 of the routine. At step 262, the new deceleration is calculated from the signals provided by the wheel sensor. At step 263, the difference between the new deceleration and the old deceleration i.e. that calculated during the preceding performance of the routine, is calculated and, at step 264, compared with a predetermined difference indicated in FIG. 10 as "6". If the difference is less than 6, step 265 notes that there is no directional change for the succeeding cycle of the routine and, at step 266, the calculated value of the new deceleration is saved for the next cycle. Step 267 determines whether the direction of change in the difference is up or down and steps 268 and 269 mark the direction as up or down, respectively, for the next cycle. Step 270 checks whether the direction of change is the same as during the preceding cycle and, if so, passes control to the step 266. If not, step 271 limits the new deceleration to the old deceleration plus or minus 6 and the limited value is saved in the step 266.

Figure 9:
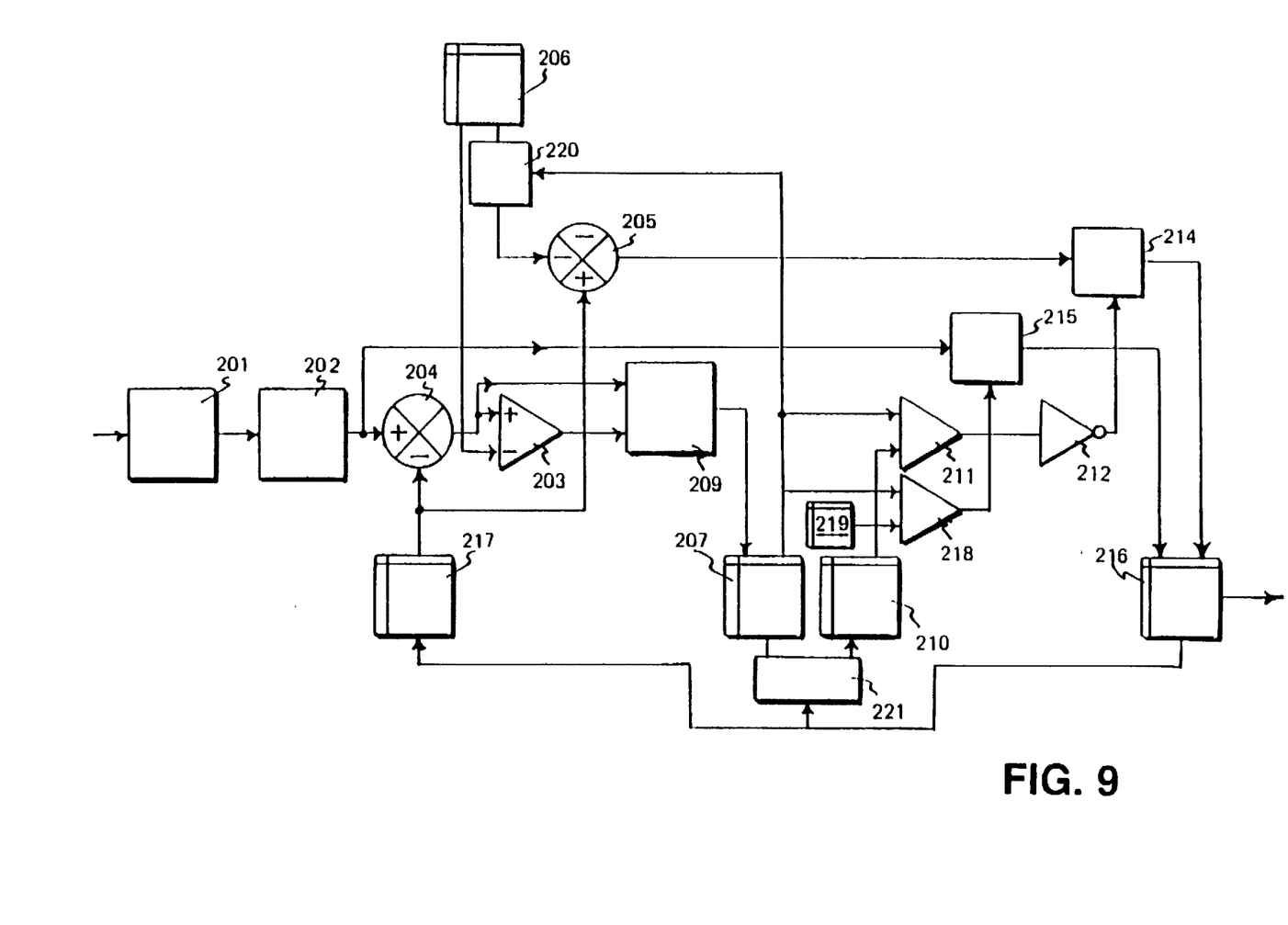
FIG. 9 illustrates a deceleration filter arrangement.

FIG. 9 shows an example of hardware for achieving the routine of FIG. 10. The signal conditioning unit 201 corresponds to the signal conditioning unit 102 of FIG. 7. Deceleration calculation is carried out at 202 and fed to a + input of an arithmetic unit 204. The − input of the arithmetic unit 203 is coupled to a store 217 holding the "old deceleration". Store 6 is coupled to the output of a "new deceleration" store 216 whose two inputs are connected respectively to "allow" units 214 and 215. "Allow" unit 214 receives the output of the arithmetic unit 205 and an inverter 212 and "allow" unit 215 receives the output of the deceleration calculation unit 202 and the output of a comparator 211. The + input of the comparator receives a "direction of change" signal from a unit 207 and its − input receives a signal from an "old direction" unit 210. The output of the comparator is also applied to the input of the inverter 212. The unit 217 receives its input from an element 209 which determines the direction of change of the deceleration from the output of the arithmetic unit 204 and the output of a further comparator 203 whose inputs are the arithmetic unit output and a reference signal provided by a unit 206 corresponding to the permissible slow limit (corresponding to the value "6" in the flow diagram of FIG. 10). The reference slow limit from unit 206 is added in a further arithmetic unit 205 to the output of the "old decelerator" unit 217 to provide an input to "allow" unit 214.

The objective of the apparatus of FIG. 9 is to provide a reliable value of wheel deceleration by filtering out any variations due to wheel suspension movement. This is achieved by first checking if the currently calculated value of deceleration is within a predetermined "slew" limit. If it is, then this calculation is allowed to update the stored value of deceleration. If the calculation is in excess of the "slew limit" value, then a check is made to see if deceleration calculated is in the same direction as that calculated in the previous processor cycle. If it is then it is assumed that the deceleration calculation is in order and the wheel is seeing a true deceleration which happens to be in excess of the predetermined "slew limit". This calculated deceleration is then used to update the deceleration value. If the direction of change of the deceleration is different to that seen in the previous processor cycle, then it is assumed that the calculated deceleration is in error and is not used to update the deceleration value. Instead, an assumed new deceleration is produced which is the sum of the old deceleration plus or minus the "slew limit" value. The "slew limit" value is added if the previous direction of change was positive and subtracted if the previous direction of change was negative i.e. if the previous indication was that the wheel was increasing in deceleration then the "slew" limit is added to produce a further assumed increase etc.

The signal conditioning of the wheel speed signal is provided by a signal conditioning unit 201. The values produced are passed to a deceleration calculator 202 which produces a current deceleration value. This current value is fed forward to an allow switch 214 which is enabled by the following processes.

The current deceleration has subtracted from it the value of old deceleration 217, the old deceleration having been calculated in the previous processor cycle. This deceleration error value produced in adder 204 provides one input to a direction of change calculating device 209. The other input to the direction of change device 209 is the value of deceleration error minus a predetermined slew limit 206. These two values are used in accordance with the processes shown in the flow chart of FIG. 10, marked as boxes 265, 268, 269 to produce a direction of change signal which is stored in a direction of change store 207. If the magnitude of the difference between the current and old deceleration values is less than or equal to the slew limit then the direction of change is marked as "NONE" and stored as NONE in store 207. If the deceleration error signal is positive i.e. UP, then the direction of change is stored as UP.

Likewise if the direction of change is DOWN then the direction of change is stored as DOWN. The current direction of change signal is fed to the one input of each of two comparators. A first comparator 211 compares the new direction of change stored in 207 with the previous processor cycle direction of change held in store 210. If the direction of change is the same i.e. both UP or both DOWN then the input to the allow switch goes high and the calculated deceleration 202 is stored as the new deceleration in store 216. Likewise, the direction of change signal from store 207 is compared in comparator 218 with a state NONE from store 219. Thus, if the stored change in direction is NONE, i.e. the calculated deceleration is less than the slew limit, the output of the comparator 218 goes high therefore enabling the allow switch which in turn permits the storage of the calculated deceleration 202 as the new deceleration in store 216. Should either of the two comparators go high, then the inverter 212 switches the input of the second allow switch 214 off and likewise, should neither of the comparators go high then the first allow switch 215 is disabled and the inverter 212 enables the second allow switch 214. Enabling this second allow switch loads the new deceleration store with the assumed change in deceleration composed of the slew limit value obtained from store 206 corrected for sign by correction unit 220 which changes the sign of the slew limit value in accordance with the direction of change of deceleration as stored in store 207. This corrected slew limit value is added to the old value of deceleration as stored in store 217 by the adder 205 and is therefore loaded into the new deceleration store 216 when the second allow switch is enabled. The new deceleration stored in store 216 is provided for use in the ensuing ABS routine. once a new value is stored in the store 216, the value is passed to the old deceleration store 217 for updating the old deceleration value for use in the next processor cycle. During this update a load change device is enabled which permits the old direction of change store 210 to be updated with the new direction of change value from the direction of change store 107.

Therefore, should the calculated value of deceleration be within predetermined limits then this value is used as the wheel deceleration signal for the remainder of the ABS routine, during that processor cycle. If the calculated deceleration value is outside the predetermined limits then an assumed value of deceleration is used as above.

Returning now to FIG. 7, the operation of the apparatus is described in connection with the diagrams of FIG. 1.

At FIG. 1, point 1, the vehicle brakes are applied. At this point, the ABS is not active and therefore no short duration pulses are issued at point 2 when the wheel deceleration traverses the APT threshold.

At point 3 in FIG. 1, a closed loop controlled dump is issued via the standard ABS detection mechanism 128. This event clears the timer 136,186 (pa break) and also clears the APT pulse counter 178,180. As a consequence of point 3, the ABS is now ACTIVE on the wheel under consideration.

At point 4, the closed loop controlled dump ends, starting the timer 186.

At point 5, the wheel deceleration exceeds the APT threshold in 164 and, since in this particular example, the optional slip check was not incorporated, a short duration pulse is issued by the pulse generation unit 122 at point 6.

The latter event triggers "increment pulse count" 180 which in turn causes the output of comparator 182 to be " ", thereby starting the "first APT timer" 184. This causes the output of comparator 148 to be " ", thereby enabling the timer periodic increment at unit 152.

At point 8, a further short duration pulse is issued by the pulse generator 122 since the wheel deceleration once more crosses the APT threshold at point 7.

At point 9, a second closed loop controlled dump is issued via the mechanism 128. At this event, the outputs of comparators 172 and 170 are switched through to the APT threshold modifiers 192 and 162, respectively.

The effect of this is to increment (make more sensitive) the APT threshold if the time measured by the "first APT pulse timer" 150 is longer than the UPPER LIMIT 176 or to maintain the APT threshold at its current value if the time is between these limits. After the APT threshold has been adjusted (or not as the case may be) the "first APT pulse timer" 150 is cleared by the combination of gates terminating at gate 158 and the "clear first APT" unit 156.

The latter operation repeats continuously.

Figure 8:
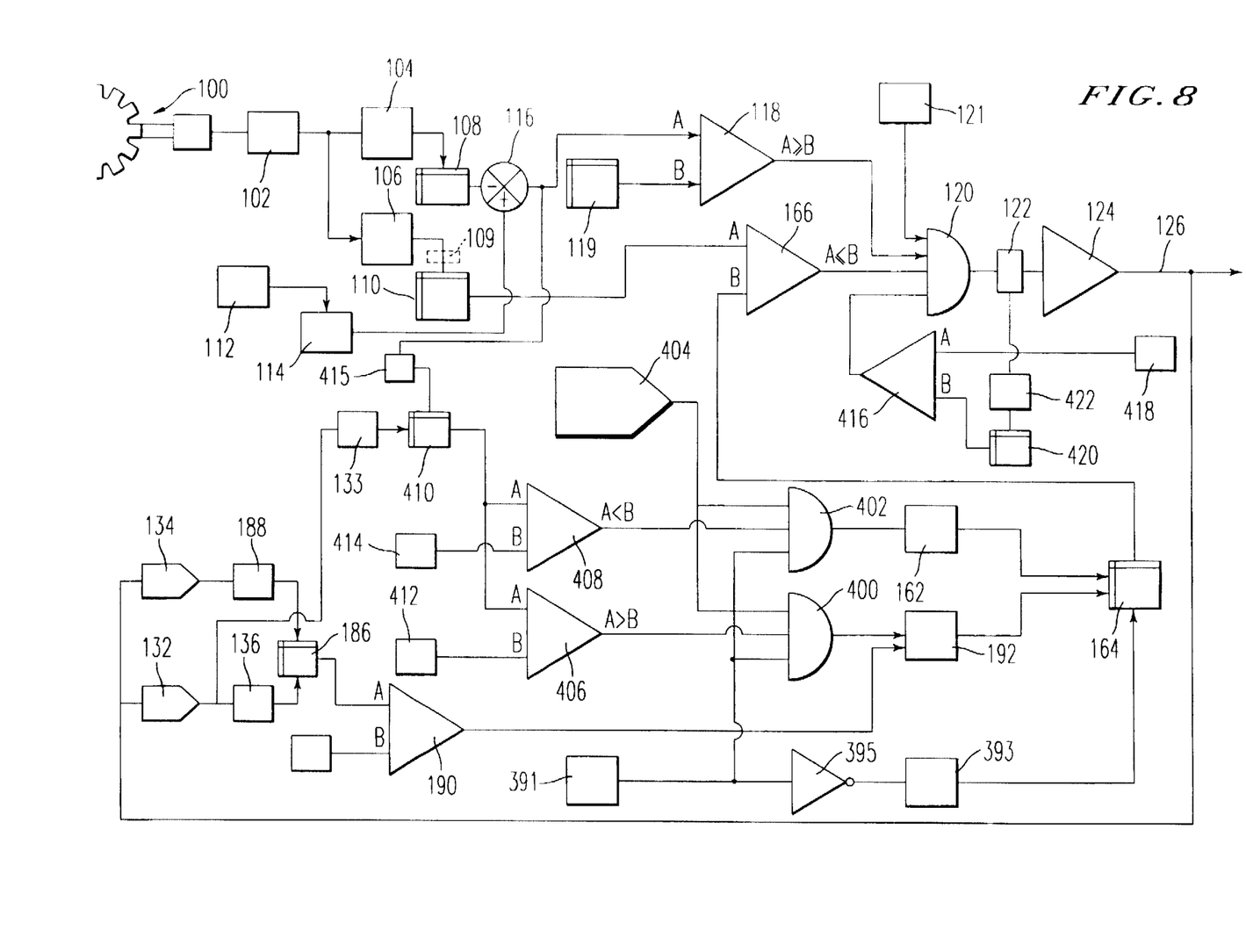
FIG. 8 illustrates a second embodiment in accordance with the present invention.

There now follows, with reference to FIG. 8, a designation of an embodiment of a deceleration dependent adaptive pulse generator in accordance with the present invention but of the second type in which the threshold adaption depends on the level of slip which occurred during the previous ABS cycle. Those parts which are identical to the embodiment of FIG. 7 are given the same reference numbers.

The "start of closed loop controlled dump" unit 132, which as before receives a signal from the line 126 when the ABS is activated, is connected to the Pa brake timer 186 via the clear timer unit 136. Likewise the "end of closed loop controlled dump" unit 134 is connected to the timer 186 via the "start timer since end of last closed loop dump" element 188. The timer 186 output is applied to the (A) input of the comparator 190, the (B) input of which is connected to reference value, eg 150 ms. The output of comparator 190 forms one input of the decrement element 192, which also receives an input from an AND gate 400. The decrement element 192 is coupled to one input of the APT threshold unit 164 whose output is coupled to one input (B) of the comparator 166. The other input of the APT threshold unit 164 is connected to the output of an AND gate 402 via the incrementing element 162. One input of the AND gate 402 is connected to one input of the AND gate 400 and also to a "start of new skid detection sequence" element 404. The other inputs of the AND gates 400 and 402 are connected to the output of further comparators 406,408, respectively. The one (A) inputs of the comparators 406,408 are connected together and also to the output of a "peak slip" store 410, whilst the other (B) inputs of the comparators 406,408 are connected respectively to an "upper limit" reference 412 and a "lower limit" reference 414. The input of the "peak slip" store 410 is connected via a "track and hold" unit 415 to the output of the arithmetic unit 116 carrying a signal representative of the prevailing wheel slip.

The AND gate 120 has a further input connected to the output of a comparator 416 whose one (A) input is connected to an element 418 which enables the "maximum number of pulses" to be preset, and whose other (B) input is connected to a pulse count store 420. The latter store is coupled to the output of the AND gate 120 via an "increment pulse count" element 422.

The peak slip store 410 also receives a reset input from a reset element 133 connected to the "start of closed loop controlled dump" unit 132. AND gate 120 receives a further input from an "ABS active" element 121. The AND gates 400, 402 receive a further input from an "ABS active" element 391, whose output is also connected via an inverter 395 and initialiser 393 to the APT threshold unit 164.

The operation of the embodiment of FIG. 8 is now described with reference to the operational curves of FIG. 11.

In the example, the upper and lower slip thresholds used in the adaption are −5% and −10%, respectively, compared to the embodiments described hereinbefore which use −10% and −20%.

Figure 11:
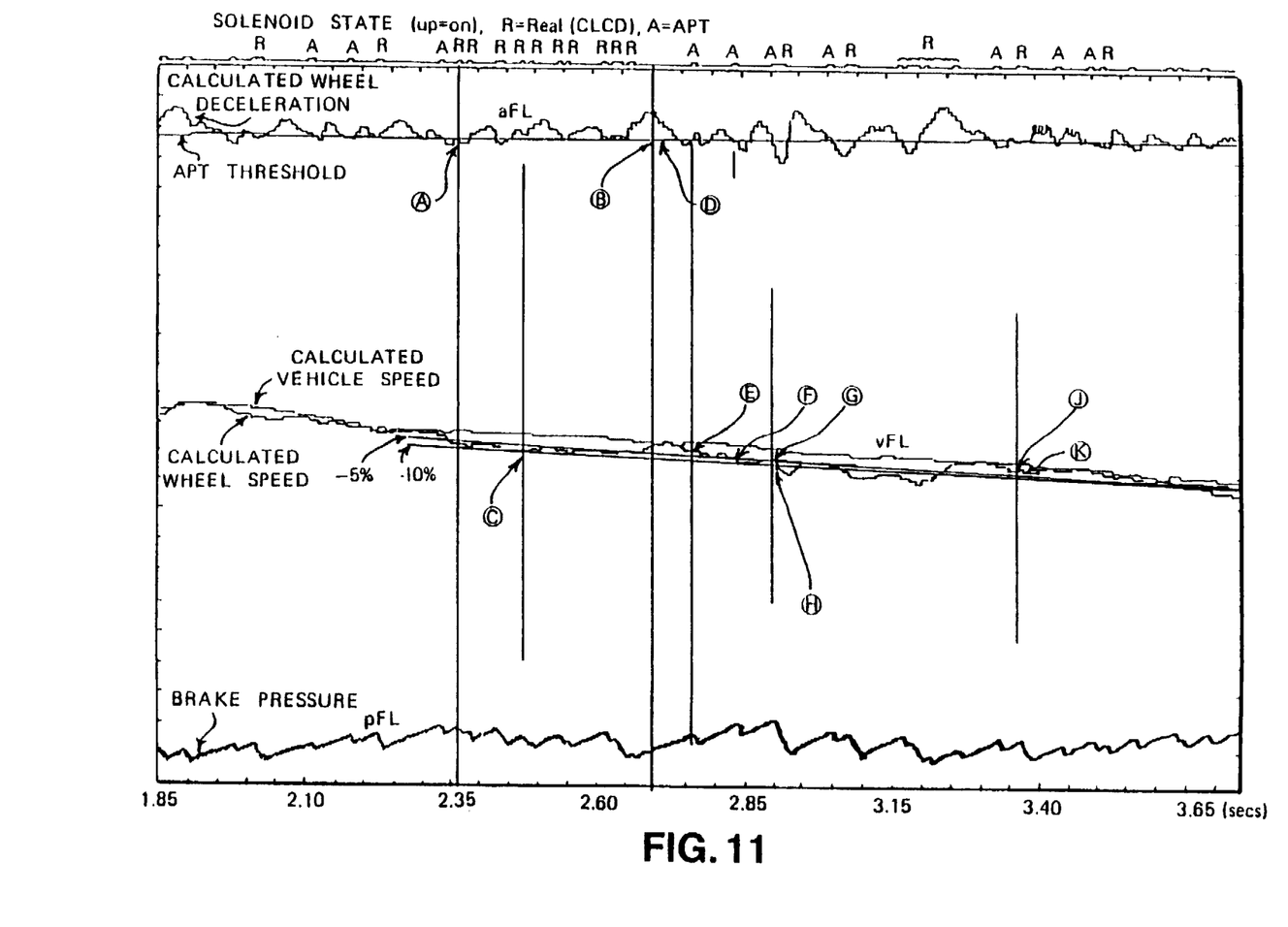
FIG. 11 shows a series of operational curves relating to the operation of the embodiment of FIG. 8.

(i) An ABS cycle begins at time 2.394 secs in FIG. 11, see point A in FIG. 11. The main solenoid, controlled via line 126, receives multiple "closed loop controlled dumps" (CLCDs) during this cycle but, since the wheel is in slip from point A to point B, these firings are in fact considered as one. (it is well known that a CLCD does not have to be continuous). Thus, the start of the ABS cycle at point A triggers the "Clear timer unit" 136 and the reset element 133, clearing the "time since last CLCD" timer 136 and the peak slip store 410, respectively.

(ii) From time A, the peak slip value is tracked by track and hold unit 415 and the peak value is stored in store 410. In this example, peak slip occurs at point C in FIG. 11 and is more negative than the lower threshold limit (−10%).

(iii) At point D, a new skid detection sequence is started and so AND gates 402,400 are enabled, switching the results from comparators 408,406 through to the increment/decrement mechanisms at elements 162, 192. In this case, because the peak slip was below the lower limit, the APT threshold at element 164 is incremented to make the system more sensitive on the next ABS cycle.

(iv) At points E and F in FIG. 11, the wheel deceleration held at element 110 is more negative than or equal to the APT threshold at element 166 and the (optional) slip qualification is met at element 118 and so a short duration pulse (APT) is issued. At point G in FIG. 11, a further APT is issued by the same criteria but this is followed immediately by the start of a new CLCD at point H.

(v) At point H, the elements 136 and 133 are triggered again and the process described in (ii), (iii) and (iv) above begins again.

(vi) Point J is the start of a new CLCD. The processes in (ii), (iii) and (iv) take place but this time the peak slip value is more positive than the upper limit (point K, in FIG. 11). Thus process (iii) in this case causes the APT threshold to be decremented to make the system less sensitive for the next ABS cycle.

We claim:

1. An anti-skid braking system for wheeled vehicles having fluid actuated brakes associated with the vehicle wheels, comprising:
    speed sensors associated with the vehicle wheels,
    a control device responsive to speed signals from the speed sensors to actuate a pressure dump device to periodically release the fluid pressure applied to the brake of any wheel which is determined to be about to lock and to later re-apply the actuating pressure to that brake when the tendency of that wheel to lock has reduced,
    a pressure re-apply phase being present from a wheel recovery point after a full pressure dump until reaching a threshold for starting a full pressure dump,
    means for pulsing said pressure dump device at intervals with at least one fixed duration pulse during the pressure re-apply phase to cause interruption to the re-application of pressure to that brake,
    means for controlling the initiation of said at least one fixed length pulse in response to the wheel angular deceleration being above a predetermined threshold value, and
    means for adjusting the magnitude of said predetermined threshold value in dependence upon information from the previous anti-lock braking cycle.

2. An anti-skid braking system as claimed in claim 1, wherein the threshold adjustment for the current skid cycle is based on the proximity of a pressure pulse in the preceding cycle to an immediately preceding pressure dump.

3. An anti-skid braking system as claimed in claim 2, including a deceleration filter which receives deceleration values calculated from the signals provided by said wheel speed sensors and which comprises checking means for checking the currently calculated value of deceleration against a predetermined limit and wherein if the calculated deceleration is less than said predetermined limit, the calculated value is used to update a stored value of deceleration.

4. An anti-skid braking system as claimed in claim 1, wherein the threshold adjustment is dependent upon the measured level of wheel slip which occurred during the previous anti-lock braking cycle.

5. An anti-skid braking system as claimed in claim 4, including a deceleration filter which receives deceleration values calculated from the signals provided by said wheel speed sensors and which comprises checking means for checking the currently calculated value of deceleration against a predetermined limit and wherein if the calculated deceleration is less than said predetermined limit, the calculated value is used to update a stored value of deceleration.

6. An anti-skid braking system as claimed in claim 1, including a deceleration filter which receives deceleration values calculated from the signals provided by said wheel speed sensors and which comprises checking means for checking the currently calculated value of deceleration against a predetermined limit and wherein if the calculated deceleration is less than said predetermined limit, the calculated value is used to update a stored value of deceleration.

7. An anti-skid braking system as claimed in claim 6, including means which, if the calculated deceleration is in excess of said predetermined limit value, establish whether the direction of change of the calculated deceleration is in the same direction as that calculated in the previous cycle of the control device.

8. An anti-skid braking system as claimed in claim 7, wherein, if the direction of change in deceleration is in the same as in the previous cycle, then the deceleration value calculated is stored as the new value of deceleration.

9. An anti-skid braking system as claimed in claim 8, wherein of the direction of change if the calculated deceleration is different to the stored from the previous control device cycle, the old deceleration value and the predetermine limit value are used to update the new stored deceleration value.

10. An anti-skid braking system as claimed in claim 9, wherein the predetermined limit value is added to the old stored deceleration value if the previous direction of change was positive and subtracted if the previous direction of change was negative.

11. A deceleration filter for use in an anti-skid braking system for wheeled vehicles, of the type comprising speed sensors associated with the vehicle wheels, a control device responsive to speed signals from the speed sensors to actuate a pressure dump device to periodically release the fluid pressure applied to the brake of any wheel which is determined to be about to lock and to later re-apply the actuating pressure to that brake when the tendency of that wheel to lock has reduced, the deceleration filter being adapted to receive deceleration values calculated from the signals provided by said wheel speed sensors and comprising checking means adapted to check the currently calculated value of deceleration against a predetermined limit and, if the calculated deceleration is less than said predetermined limit, to use the calculated value to update a stored value of decelerations.

12. A deceleration filter as claimed in claim 11 including means which, if the calculated deceleration is in excess of said predetermined limit value, establishes whether the direction of change of the calculated deceleration is in the same direction as that calculated in the previous cycle of the control device.

13. A deceleration filter as claimed in claim 12 wherein, if the direction of change in the deceleration is the same as in the previous cycle, then the deceleration value calculated is stored as the new value of deceleration.

14. A deceleration filter as claimed in claim 12, wherein if the direction of change of the calculated deceleration is different to that stored from a previous control device cycle, the old deceleration value and the predetermined limit value are used to update the new stored deceleration value.

15. A deceleration filter as claimed in claim 14, wherein the predetermined limit value is added to the old stored deceleration value if the previous direction of change was positive and subtracted if the previous direction of change was negative.

* * * * *